(12) United States Patent
Chikaoka et al.

(10) Patent No.: US 8,064,698 B2
(45) Date of Patent: Nov. 22, 2011

(54) FIXED FORM IMAGE READING APPARATUS AND FIXED FORM IMAGE READING METHOD USING THE SAME

(75) Inventors: Atsuhiko Chikaoka, Osaka (JP); Tetsuya Shihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1057 days.

(21) Appl. No.: 11/978,603

(22) Filed: Oct. 30, 2007

(65) Prior Publication Data

US 2008/0107359 A1 May 8, 2008

(30) Foreign Application Priority Data

Oct. 31, 2006 (JP) ................. 2006-296875

(51) Int. Cl.
*G06K 9/00* (2006.01)
*G06K 7/10* (2006.01)
(52) U.S. Cl. ..................... 382/181; 235/462.1
(58) Field of Classification Search .................. 382/100, 382/181
See application file for complete search history.

(56) References Cited

U.S. PATENT DOCUMENTS

| | | | | | |
|---|---|---|---|---|---|
| 4,958,272 | A | * | 9/1990 | Wake | 345/597 |
| 5,907,148 | A | * | 5/1999 | Iwafuchi et al. | 235/472.01 |
| 6,519,351 | B2 | * | 2/2003 | Kimura et al. | 382/100 |
| 7,407,104 | B2 | * | 8/2008 | Aoyama | 235/462.1 |
| 7,672,031 | B2 | * | 3/2010 | Tange et al. | 359/22 |
| 2004/0233305 | A1 | * | 11/2004 | Morishita | 348/245 |
| 2005/0185233 | A1 | * | 8/2005 | Baba et al. | 359/9 |
| 2005/0231774 | A1 | * | 10/2005 | Hayashi et al. | 359/10 |
| 2006/0097062 | A1 | * | 5/2006 | Cheong et al. | 235/494 |
| 2006/0269134 | A1 | * | 11/2006 | Wang et al. | 382/181 |
| 2007/0036430 | A1 | * | 2/2007 | Katsumata et al. | 382/162 |
| 2007/0091322 | A1 | * | 4/2007 | Tano | 356/610 |

FOREIGN PATENT DOCUMENTS

| JP | 08-307775 | 11/1996 |
|---|---|---|
| JP | 2001-094882 | 4/2001 |

OTHER PUBLICATIONS

"Barcode Readers using the Camera Device in Mobile Phones," Eisaku Ohbuchi, et al. Proceedings of the 2004 International Conference on Cyberworlds (CW'04), 2004, pp. 1-5.*

* cited by examiner

*Primary Examiner* — Wenpeng Chen
(74) *Attorney, Agent, or Firm* — Morgan, Lewis & Bockius LLP

(57) ABSTRACT

An fixed form image reading apparatus includes an imaging portion for taking an image of a fixed form image formed in accordance with a predetermined rule so as to deliver image data, a luminance detecting portion that detects an accumulated value of luminance of a plurality of predetermined areas in the fixed form image as reference luminance data, an interpolation coefficient generating portion that generates an interpolation coefficient for performing interpolation so that luminance of the image data of the fixed form image becomes a predetermined level by using the reference luminance data, and a luminance correcting portion that corrects luminance of the image data of the fixed form image based on the interpolation coefficient.

13 Claims, 7 Drawing Sheets

FIXED FORM IMAGE READING APPARATUS AND FIXED FORM IMAGE READING METHOD USING THE SAME

This application is based on Japanese Patent Application No. 2006-296875 filed on Oct. 31, 2006, the contents of which are hereby incorporated by reference.

BACKGROUND OF THE INVENTION

1. Field of the Invention

The present invention relates to a fixed form image reading apparatus and a method for reading a fixed form image that has a regular shape like a hologram or a two-dimensional code.

2. Description of Related Art

Recently, two-dimensional codes that can store more information in a smaller area than one-dimensional codes (so-called bar codes) are used. The two-dimensional code can store a large capacity of information compared with a conventional bar code, and it has little limitation of reading direction because it has a position detection mark.

The reading apparatus for reading the two-dimensional code optically is equipped with an image sensor such as a CCD, a CMOS, a photo diode or the like for detecting an optical signal and converting it into an electric signal, a decode circuit for converting the electric signal into code information, and optical elements including a collimator lens, an objective lens, a mirror, a polygon mirror and the like. In addition, there is a case where it is equipped with a light source that projects light to the two-dimensional code as necessity.

The reading apparatus takes an image of the two-dimensional code by the image sensor and decodes its image data by a decoding portion so that data stored in the two-dimensional code is extracted.

The reading apparatus is vulnerable to influences of dark current of the image sensor or noises. In order to remove such influences, there is disclosed an imaging apparatus in which an image is taken in the state where its shutter is closed (i.e., the state where incident light of the image sensor is shut out), and correction is performed based on image data obtained from the image sensor in the state where the shutter is closed (see JP-A-H8-307775, JP-A-2001-94882 and the like, for example).

The fixed form image such as the two-dimensional code or the like has a marker for detecting its position (direction or place). The marker is formed so that a large luminance change is generated, and the marker is detected based on the luminance change for detecting the position.

However, if luminance changes largely in the image sensor, the part of the image data (the part where the luminance changes largely) is formed with gradation. As a result, there is a case where an actual fixed form image is different from an image obtained by the image sensor. The fixed form image is formed in accordance with a predetermined rule. If the obtained image is different from the actual fixed form image, data stored in it may not be extracted or obtained data may not be correct data even if it is extracted.

SUMMARY OF THE INVENTION

An object of the present invention is to provide a fixed form image reading apparatus and a fixed form image reading method using the same, which can take a fixed form image correctly and extract data included in the fixed form image correctly.

Another object of the present invention is to provide a fixed form image reading apparatus and a fixed form image reading method using the same, which can extract data stored in a fixed form image correctly at high speed.

A fixed form image reading apparatus according to an embodiment of the present invention is an fixed form image reading apparatus that has an imaging portion for taking an image of a fixed form image formed in accordance with a predetermined rule and for delivering image data, so that data included in the fixed form image is extracted. The fixed form image reading apparatus includes a luminance detecting portion that detects an accumulated value of luminance of a plurality of predetermined areas in the fixed form image as reference luminance data, an interpolation coefficient generating portion that generates an interpolation coefficient for performing interpolation so that luminance of the image data of the fixed form image becomes a predetermined level by using the reference luminance data, and a luminance correcting portion that corrects luminance of the image data of the fixed form image based on the interpolation coefficient.

According to this structure, when the fixed form image reading apparatus reads the fixed form image, it is possible to remove easily an undesired component mixed in the image data due to distortion of the optical system, the recording medium or the like that is caused by generation of gradation exceeding a resolution of the imaging portion.

Thus, data stored in the fixed form image can be read correctly, so that ratio of errors can be reduced.

In a preferred embodiment of the present invention, a shutter is provided for shutting out incident light of the imaging portion.

In a preferred embodiment of the present invention, the fixed form image is a two-dimensional code.

In a preferred embodiment of the present invention, it is provided with a laser light source for emitting a laser beam and an objective lens for condensing the laser beam to be projected onto the fixed form image. In addition, it is provided with a space modulator for performing space modulation of the laser beam. As the fixed form image, there is a hologram.

A fixed form image reading apparatus according to another embodiment of the present invention includes a laser light source that emits a laser beam, a space modulator that performs space modulation of the laser beam, an objective lens that condenses the laser beam to be projected onto a fixed form image formed in accordance with a predetermined rule, an image sensor that detects the laser beam reflected by a recording medium and converts it into an electric signal, a demodulating portion that demodulates an electric signal delivered from the image sensor and delivers image data, a storing portion that stores first image data obtained by exposing the image sensor in the state where incident light of the image sensor is shut out, and a noise removing portion that removes noises unique to the image sensor by subtracting the first image data from the image data of the fixed form image. The fixed form image includes a plurality of position detection marks formed at predetermined positions to have higher luminance than other part. A luminance detecting portion is provided for detecting an accumulated value of luminance corresponding to each of the position detection marks from luminance distribution of the position detection mark of the image data of the fixed form image as reference luminance data. An interpolation coefficient generating portion is provided for generating an interpolation coefficient for performing interpolation so that luminance of the image data of the fixed form image becomes a predetermined level by using the reference luminance data, and a luminance correcting portion is provided for correcting luminance of the image data of the fixed form image based on the interpolation coefficient.

A fixed form image reading method according to another embodiment of the present invention is a method for taking an image of a fixed form image formed in accordance with a predetermined rule by a fixed form image reading apparatus having a laser light source for emitting a laser beam, a space modulator that performs space modulation of the laser beam, an objective lens that condenses the laser beam to be projected onto a fixed form image formed in accordance with a predetermined rule, and an imaging portion detecting the laser beam reflected by the fixed form image so as to obtain image data, and for extracting data included in the fixed form image. The fixed form image reading method includes the steps of a storing step for storing first image data obtained by exposing the imaging portion in the state where incident light of the imaging portion is shut out, a laser beam emitting step for emitting the laser beam, an imaging step for detecting the laser beam reflected by the recording medium so as to obtain image data, a noise removing step for removing noises unique to the imaging portion by subtracting the first image data from the image data of the fixed form image obtained in the imaging step, a luminance detecting step for detecting an accumulated value of luminance corresponding to each of position detection marks, which are included in the fixed form image formed at predetermined positions to have higher luminance than other part, from luminance distribution of the position detection mark of the image data of the fixed form image as reference luminance data, an interpolation coefficient generating step for generating an interpolation coefficient for performing interpolation so that luminance of the fixed form image becomes a predetermined level by using the reference luminance data, and a luminance correcting step for correcting luminance of the image data of the fixed form image based on the interpolation coefficient.

DETAILED DESCRIPTION OF THE PREFERRED EMBODIMENTS

Figure 1:
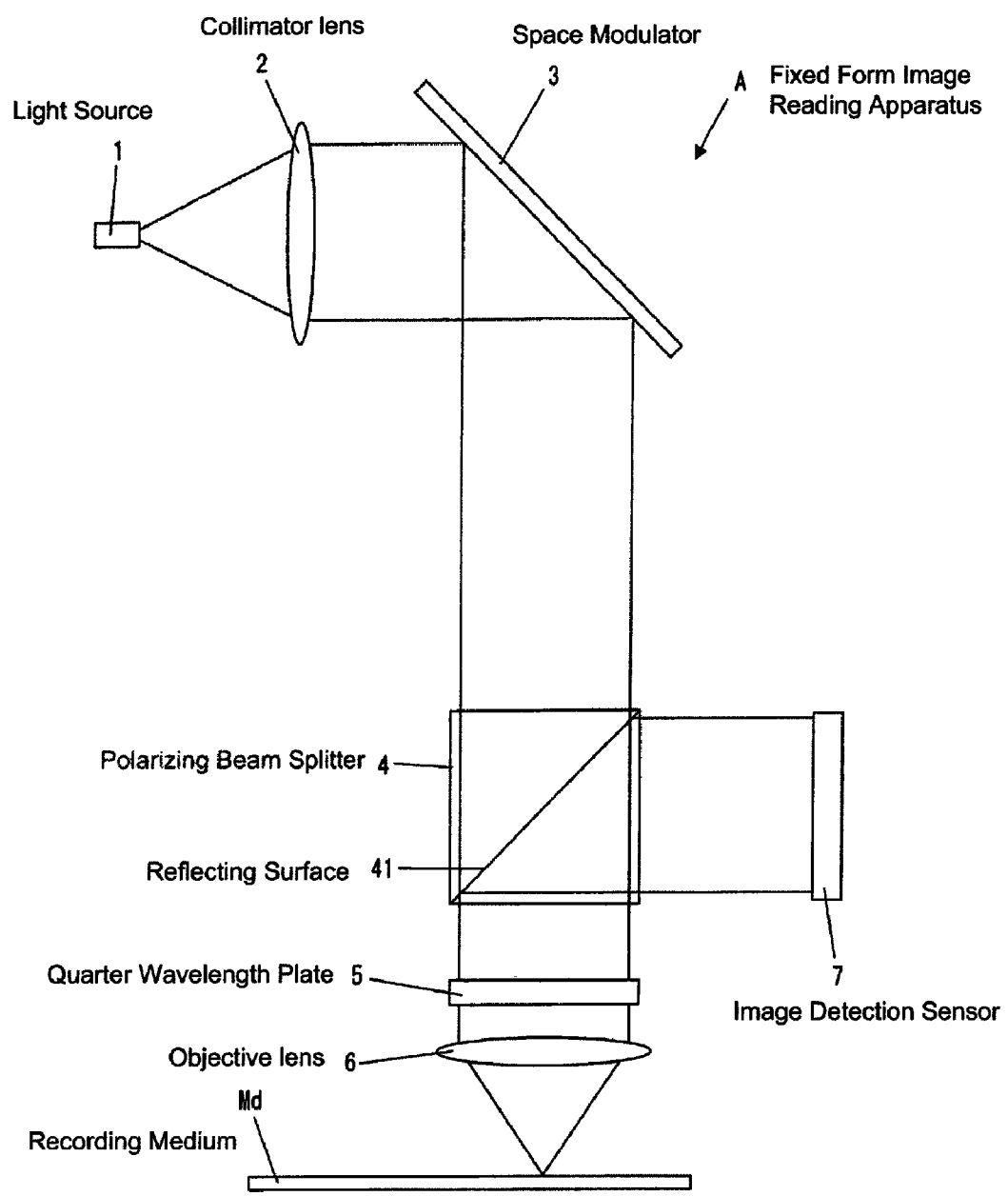
FIG. 1 is a diagram showing a general arrangement of optical elements of a fixed form image reading apparatus according to the present invention.
Figure 2:
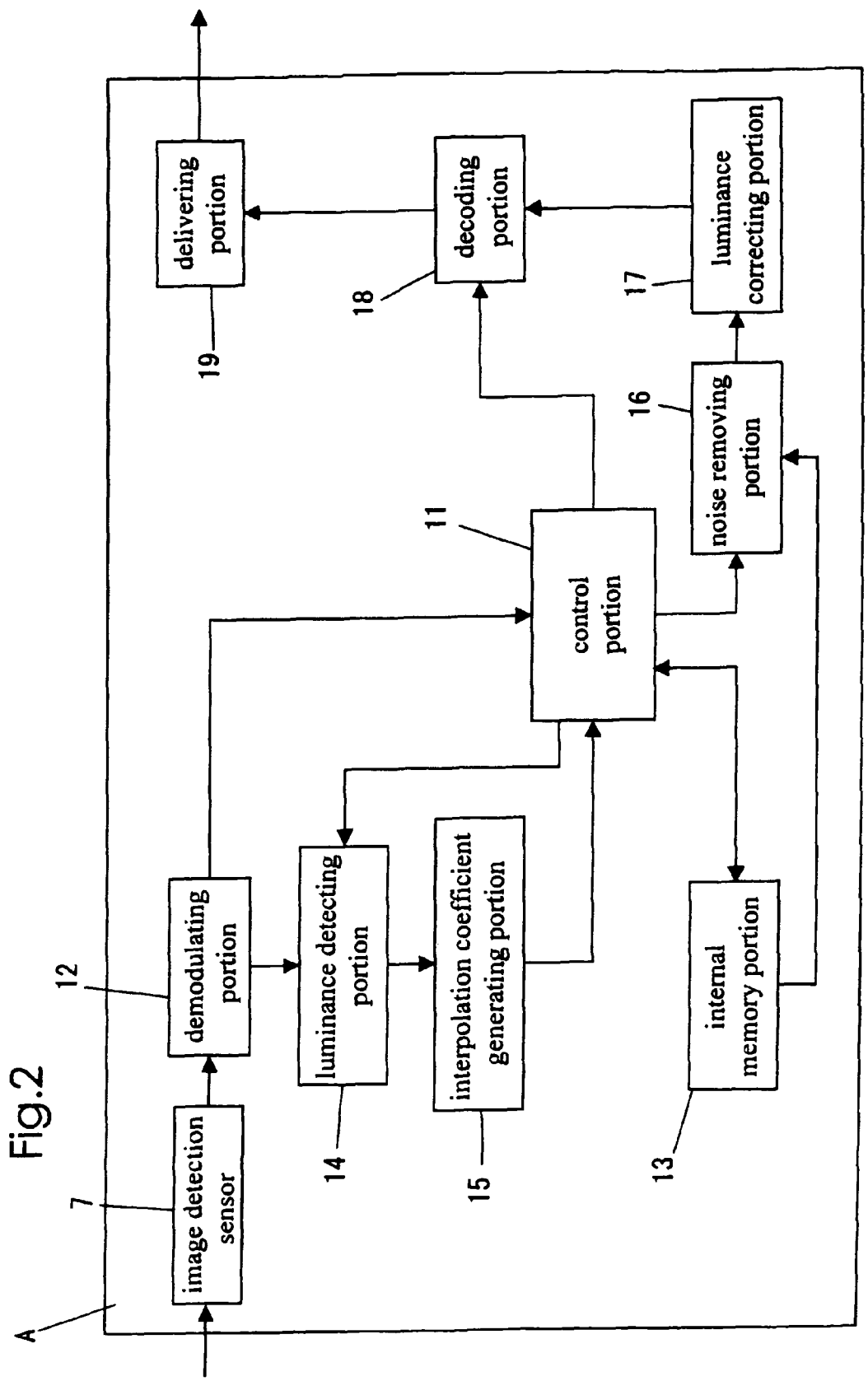
FIG. 2 is a block diagram showing a structure of the fixed form image reading apparatus shown in FIG. 1.
Figure 3:
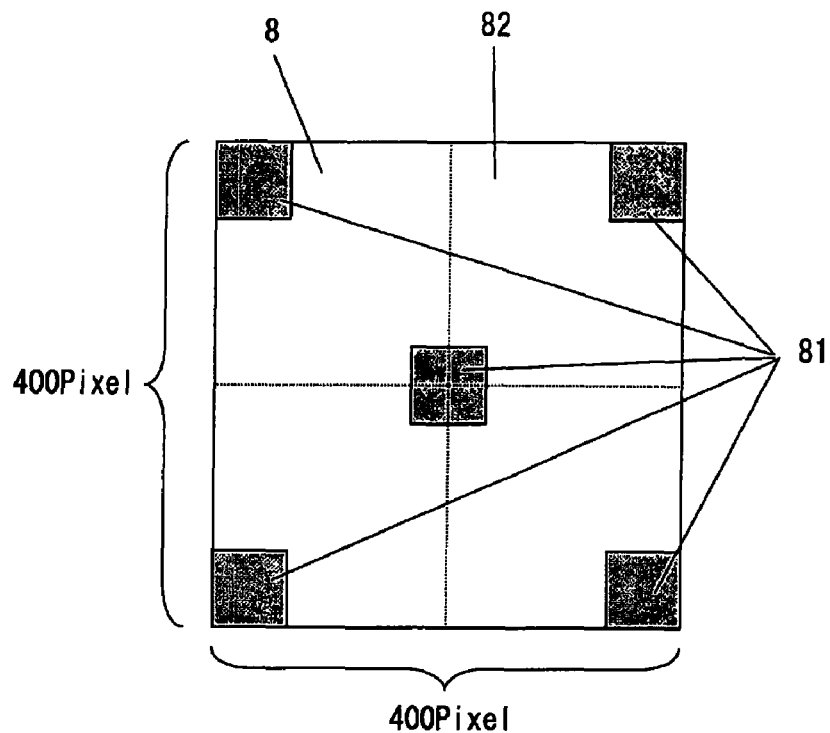
FIG. 3 is a diagram showing an example of a fixed form image and a position detection mark.
Figure 4:
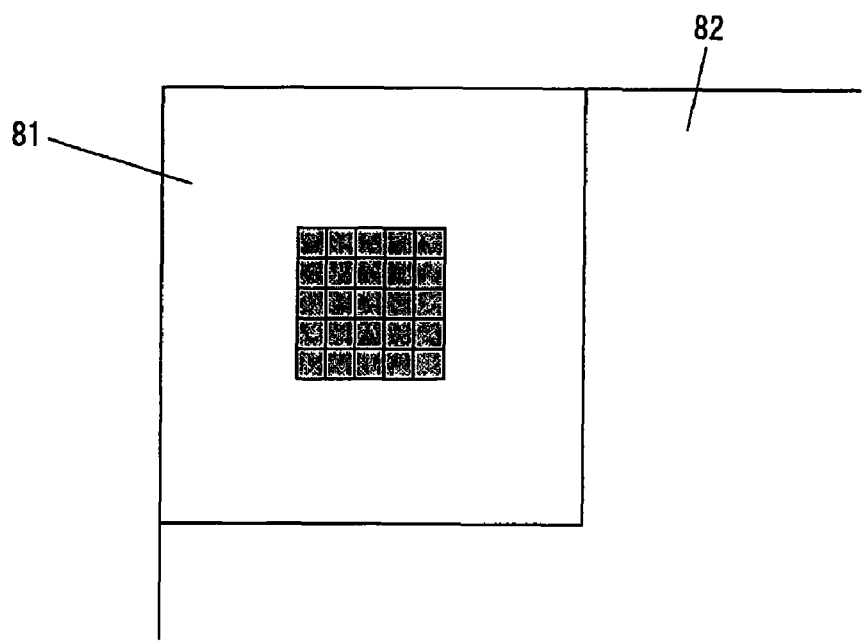
FIG. 4 is an enlarged view of the fixed form image and the position detection mark shown in FIG. 3.

Hereinafter, an embodiment of the present invention will be described with reference to the attached drawings. FIG. 1 is a diagram showing a general arrangement of an example of a fixed form image reading apparatus according to the present invention, FIG. 2 is a block diagram showing a structure of the fixed form image reading apparatus, FIG. 3 is a schematic diagram of a fixed form image and a position detection mark provided to the fixed form image, and FIG. 4 is a enlarged view of the fixed form image and the position detection mark shown in FIG. 3. The fixed form image reading apparatus A shown in FIG. 1 is a reading apparatus that takes a fixed form image by projecting light to the recording medium Md and reads data included in the fixed form image, and it includes at least a light source 1, a collimator lens 2, a space modulator 3, a polarizing beam splitter 4, a quarter wavelength plate 5, an objective lens 6 and an image detection sensor 7.

The light source 1 emits light having wavelength corresponding to a recording medium Md. As the light source 1, a laser diode utilizing a semiconductor laser element is used, for example. The laser diode is an element that emits a laser beam having a predetermined wavelength when an electric power is supplied to it. The laser beam emitted from the laser diode is linearly polarized light.

The collimator lens 2 converts divergent light into parallel rays. The laser diode as the light source 1 is a point source of light, and the laser beam emitted from the light source 1 is divergent light. This laser beam passes through the collimator lens 2 and is converted into parallel rays.

The space modulator 3 is an optical modulation device that modulates the laser beam in accordance with the fixed form image recorded on the recording medium Md. More specifically, the space modulator 3 has a plurality of pixel electrodes arranged in a matrix or in a circular shape corresponding to a fixed form image, and it modulates the laser beam to have a component distribution corresponding to the arrangement shape of the pixel electrodes. The space modulator 3 modulates the laser beam by reflecting or letting the laser beam pass through, and it can be a DMD (Digital Micromirror Device: registered trademark) or a liquid crystal space optical modulator or the like, for example.

The polarizing beam splitter 4 is a prism having a reflecting surface 41 that reflects incident light or allows the same to pass through in accordance with its polarization direction. The laser beam emitted from the light source 1 is light having the P-polarization (oscillation direction is perpendicular to the paper). Since the polarization direction of the laser beam is not changed by the space modulator 3, it passes through the reflecting surface 41 of the polarizing beam splitter 4.

The quarter wavelength plate 5 converts linear polarization into circular polarization, and it converts circular polarization to linear polarization. The laser beam emitted from the polarizing beam splitter 4 has linear polarization (P-polarization) and passes through the quarter wavelength plate 5 so as to be converted into light having circular polarization.

The laser beam emitted from the quarter wavelength plate 5 enters the objective lens 6 as light having circular polarization. The objective lens 6 condenses the laser beam to be projected to the fixed form image recorded on the recording medium Md. The objective lens 6 has a numerical aperture adapted to a structure of the recording medium Md and a size of the fixed form image, so that the laser beam is projected to the fixed form image correctly.

The laser beam reflected by the recording medium Md has a phase that is a half wavelength shifted from the laser beam projected to the recording medium Md. The laser beam reflected by the recording medium Md is converted into parallel rays when passing though the objective lens 6 and then enters through the quarter wavelength plate 5. The laser beam is converted by the quarter wavelength plate 5 from light with circular polarization to light with linear polarization. Its phase is shifted by a half wavelength when it is reflected by the recording medium Md, and the laser beam that passed through the quarter wavelength plate 5 is converted into light with S-polarization (light with oscillation direction is perpendicular to the paper).

The laser beam that passed through the quarter wavelength plate 5 enters the polarizing beam splitter 4. The laser beam with S-polarization is reflected by the reflecting surface 41 of the polarizing beam splitter 4. The reflected laser beam enters the image detection sensor 7.

The image detection sensor 7 is an element that receives the laser beam reflected by the reflecting surface 41 of the polarizing beam splitter 4 and converts it into an electric signal. The laser beam reflected by the reflecting surface 41 is enters the image detection sensor 7 as substantially parallel rays, and a sensor that can deliver the two-dimensional image as an electric signal is used as the image detection sensor 7. It is possible to use a known image sensor such as a CCD, a CMOS sensor or the like as the image detection sensor 7, and a CCD is used in this example. Here, although the case where the laser beam that enters the image detection sensor 7 is substantially parallel rays is exemplified, the present invention is not limited to the example. It is possible to dispose an optical element such as a lens before the image detection sensor 7, so that the laser beam is concentrated.

The fixed form image reading apparatus A shown in FIG. 2 shows a structure of a processing portion that performs a process of taking a fixed form image and delivers the same by the image detection sensor 7 of the fixed form image reading apparatus A shown in FIG. 1.

A fixed form image 8 shown in FIG. 3 is image data having 400 pixels in each of the horizontal and the vertical directions, though it is not limitation. The fixed form image 8 includes five position detection marks 81 for detecting upper, lower, left and right directions in the obtained image. Other region than the position detection marks 81 is a user data region 82 for recording user data. Although five position detection marks 81 are included in the fixed form image 8 shown in FIG. 3, the present invention is not limited to this. It is possible to adopt another number of position detection marks for detecting upper, lower, left and right directions, but it is preferable that they are arranged at edge portions and the center portion of the fixed form image 8 (as shown in FIG. 3). In addition, it is preferable that they are arranged in a symmetric manner with respect to the center line of the fixed form image 8 or with respect to the center point of the fixed form image.

In addition, the position detection mark 81 shown in FIG. 4 is filled-in rectangular image data like a matrix having 5 pixels in each of the horizontal and vertical directions in the middle portion of the image data having 20 pixels in each of the horizontal and vertical directions here, though it is not limitation. In the image detection sensor 7 of the fixed form image reading apparatus A, the filled-in pixels have high luminance and other pixels have low luminance in the read image data. In this way, luminance of the filled-in rectangular portion in the middle is high when the image detection sensor 7 senses it. It is preferable that the filled-in portion is formed not to be adjacent to the user data region 82. It they are adjacent to each other, it is preferable that they are connected to each other partially.

Although the concrete shape of the position detection mark 81 is described above, this shape should not be interpreted in a limited manner. It is possible, for example, to adopt another shape in which a block region having a predetermined ratio (e.g., ratio of area) to be detected with high luminance (81 in FIG. 3) is provided, and around it a region to be detected with low luminance is provided. In addition, although the fixed form image shown in FIG. 3 is a square shape of data, the present invention is not limited to it. It is possible to adopt other shapes such as a circular shape or a polygonal shape.

As shown in FIG. 2, the fixed form image reading apparatus A includes at least a control portion 11, the image detection sensor 7, a demodulating portion 12, a internal memory portion 13, a luminance detecting portion 14, an interpolation coefficient generating portion 15, a noise removing portion 16, a luminance correcting portion 17, a decoding portion 18 and a delivering portion 19. The image detection sensor is an image sensor as described above, which converts incident light into an electric signal and delivers the signal.

The control portion 11 is a central processing unit that controls and drives the individual portions of the fixed form image reading apparatus A so as to process the image data of the fixed form image. In addition, the control portion 11 is a head portion that performs control of the individual processing portions, computation of data, process of the same, and the like. The control portion 11 includes a processing unit such as a microprocessor or a CPU.

The demodulating portion 12 demodulates the electric signal supplied from the image detection sensor 7. It also includes an A/D converter that converts analog data into digital data. The image data demodulated by the demodulating portion 12 includes luminance distribution data, which is sent to the luminance detecting portion 14.

The internal memory portion 13 stores the demodulated image data. In addition, it is a medium for storing various data temporarily retained by the fixed form image reading apparatus A. It is made up of a writable RAM (Random Access Memory), a hard disk drive or the like, for example. The internal memory portion 13 also stores process data or the like temporarily when the control portion 11 performs various kinds of information processing, for example.

The luminance detecting portion 14 extracts luminance distribution of the position detection marks 81 from the luminance distribution data included in the image data demodulated by the demodulating portion 12 and calculates an accumulated value of luminance in each of the position detection marks 81 as the reference luminance data.

The interpolation coefficient generating portion 15 generates the interpolation coefficient for interpolating the luminance distribution of the image data of the fixed form image 8 to be smooth based on the reference luminance data of each position detection mark 81. The interpolation process will be described later.

The noise removing portion 16 is provided for removing image errors unique to the image detection sensor 7 from the image data. The image detection sensor 7 is exposed in the state where incident light is shut out, and an image data obtained at that time is stored in advance as a first image data in the internal memory portion 13. The noise removing portion 16 subtracts the first image data from the image data of the fixed form image 8 so as to remove the noises unique to the image detection sensor 7.

The luminance correcting portion 17 corrects the luminance of the image data of the fixed form image 8 by using the interpolation coefficient generated by the interpolation coefficient generating portion 15.

The decoding portion 18 extracts storage data stored inside from the image data of the fixed form image 8. The storage data extracted by the decoding portion 18 is digital data. The storage data is sent to the delivering portion 19 and delivered externally as the digital data or after converted into analog data.

Figure 5:
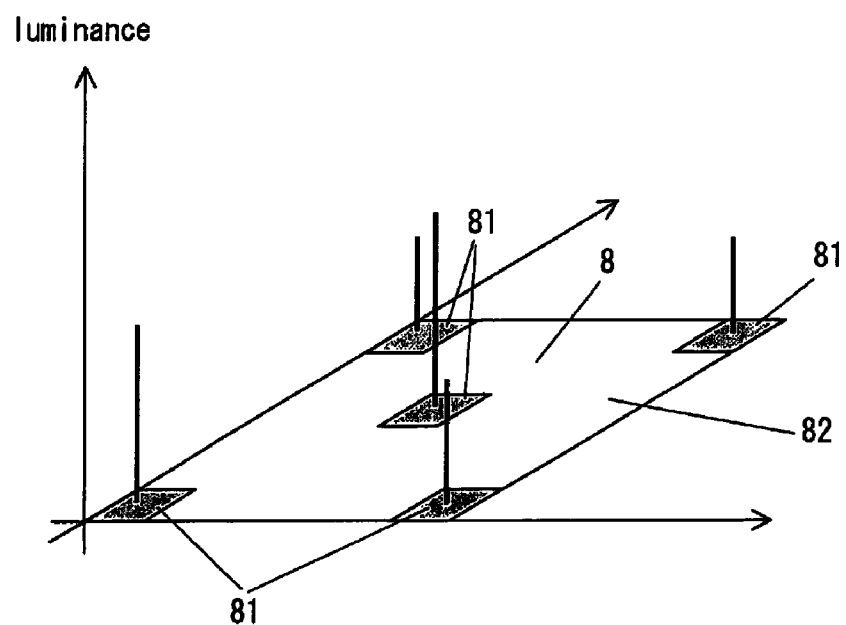
FIG. 5 is a concept diagram of reference luminance data of image data before correction with an interpolation coefficient.
Figure 6:
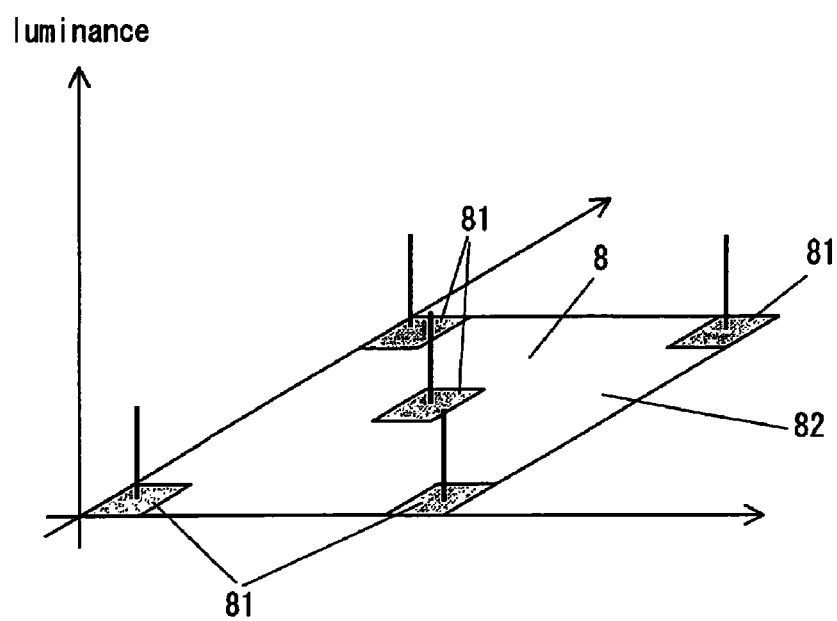
FIG. 6 is a concept diagram of the reference luminance data of the image data after the correction.
Figure 7:
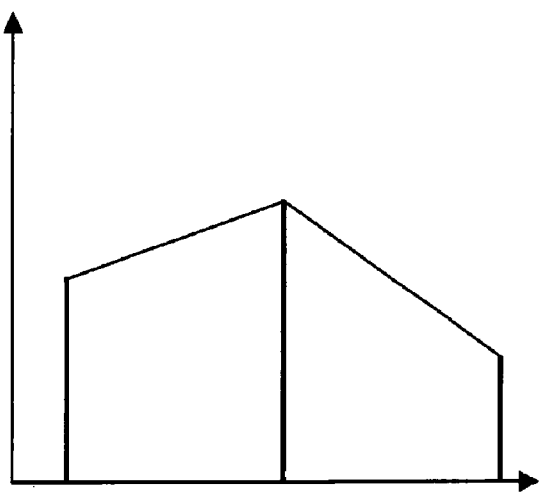
FIG. 7 is a graph showing a luminance distribution of three points in the image data before the correction.
Figure 8:
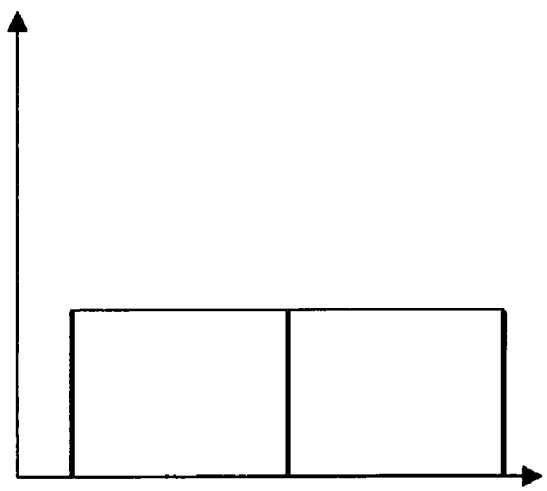
FIG. 8 is a graph showing the luminance distribution of the three points in the image data after the correction.

Next, the luminance correction will be described. FIG. 5 is a concept diagram of the reference luminance data of the image data before the correction with the interpolation coefficient, and FIG. 6 is concept diagram of the reference luminance data of the image data after the correction. In addition, FIG. 7 is a graph showing the luminance distribution of three points of the image data before the correction, and FIG. 8 is a graph showing the luminance distribution of three points of the image data after the correction. Note that the accumulated value of the luminance of the position detection mark 81 is used as the reference luminance data here. Without limiting this structure, it is possible to prepare another reference luminance data.

As shown in FIG. 5, the image data of the fixed form image 8 includes a variation of luminance due to quality of the recording medium Md or distortion of the optical system of the fixed form image reading apparatus A or the like, and the variation of luminance is mixed into the image data. If the variation of luminance exceeds a resolution of the image detection sensor 7, an undesired component will be formed like gradation in the image data from a high luminance portion to a low luminance portion.

If the undesired component formed like gradation appears, a shape of the image data may become different from a shape of the fixed form image, so that the data stored in the fixed form image cannot be extracted correctly. In order to remove the undesired component formed like gradation, the interpolation coefficient for interpolating between individual reference luminance data is calculated, and the image data is corrected by using the interpolation coefficient. Thus, as shown in FIG. 6, the uneven luminance distribution is equalized as much as possible so that the undesired component formed like gradation can be removed.

The interpolation coefficient generating portion 15 approximates the luminance distribution between reference luminance data of the fixed form image 8 as shown in FIG. 7 in accordance with a predetermined interpolation method, and it further derives the interpolation coefficient that enables correction to a horizontal luminance distribution without inclination as shown in FIG. 8. Without limiting to this structure, other known interpolation method or a newly developed interpolation method may be used for generating an interpolation equation or the interpolation coefficient that enables correction to a linear luminance distribution without inclination as shown in FIG. 8.

Figure 9:
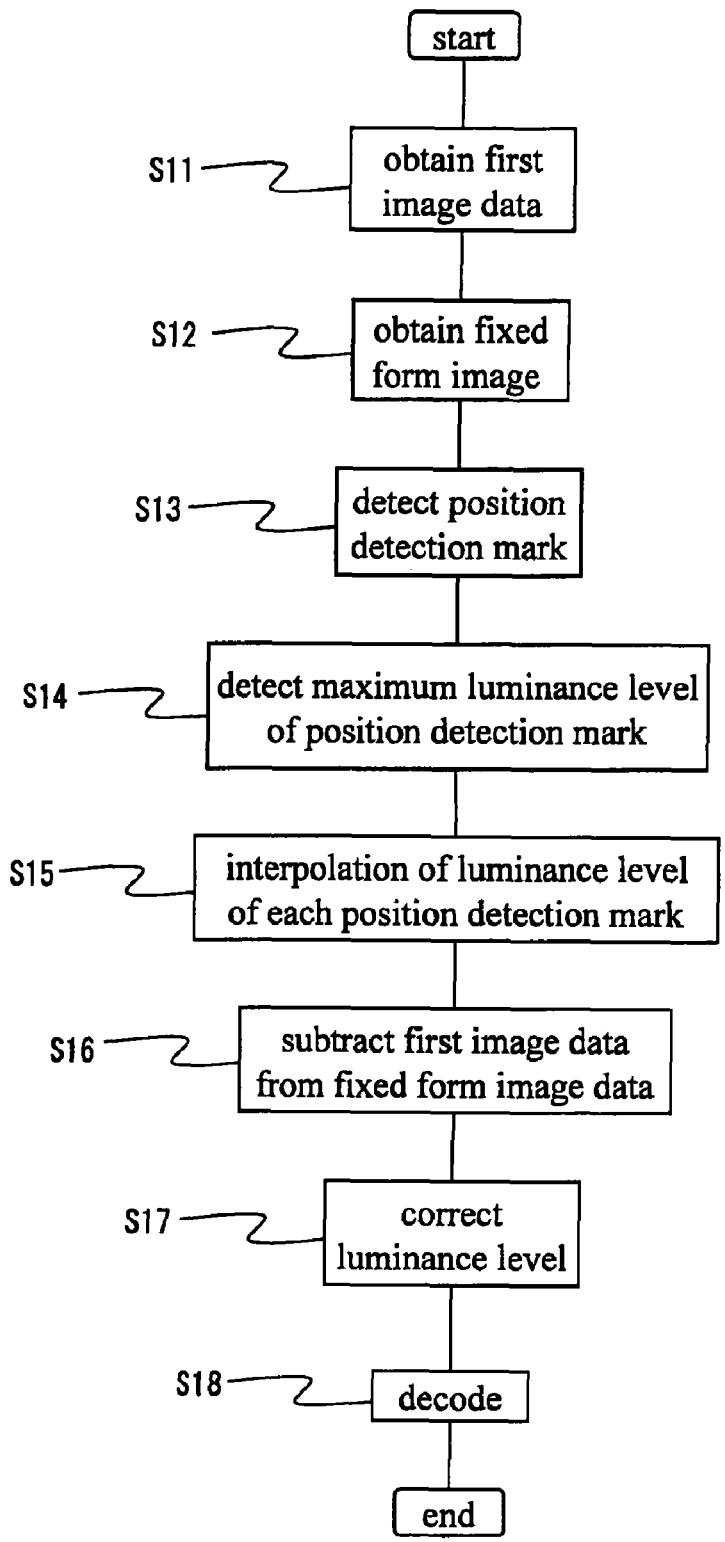
FIG. 9 is a flowchart showing a method for reading information from the fixed form image.

Next, a procedure of extracting data stored in the fixed form image 8 using the fixed form image reading apparatus A will be described. FIG. 9 is a flowchart showing an example of the fixed form image reading method. The control portion 11 exposes the image detection sensor 7 in the state where incident light of the image detection sensor 7 is shut off and makes the demodulating portion 12 to demodulate so as to store a result thereof in the internal memory portion 13 (Step S11). By exposing the image detection sensor 7 in this way, image data (the first image data) for extracting noises unique to the image detection sensor 7 can be obtained. The first image data is stored in the internal memory portion 13.

The control portion 11 drives the light source 1 to emit the laser beam, which is projected to the fixed form image 8 formed on the recording medium Md. Then, it takes the fixed form image 8 and stored the image data in the internal memory portion 13 (Step S12). On this occasion, the electric signal delivered from the image detection sensor 7 is demodulated by the demodulating portion 12, and the obtained image data is stored in the internal memory portion 13.

The control portion 11 detects the position detection mark 81 of the image data stored in the internal memory portion 13 (Step S13). In addition, the luminance information included in the image data stored in the internal memory portion 13 and position information of the position detection mark 81 are sent to the luminance detecting portion 14. The luminance in each of the position detection mark 81 is accumulated (Step S14) and sent to the interpolation coefficient generating portion 15 so as to generate the interpolation coefficient (Step S15). The interpolation coefficient is sent to the control portion 11 and is stored in the internal memory portion 13.

The control portion 11 reads out the first image data and the image data of the fixed form image 8 stored in the internal memory portion 13 and sends them to the noise removing portion 16. The noise removing portion 16 removes noises unique to the image detection sensor 7 from the image data of the fixed form image 8 by subtracting the first image data from the image data of the fixed form image 8 (Step S16). The image data after removing noises is sent to the luminance correcting portion 17.

The control portion 11 reads out the interpolation coefficient stored in the internal memory portion 13 and sends it to the luminance correcting portion 17. The luminance correcting portion 17 corrects luminance of the image data by using the interpolation coefficient (Step S17). The image data after the luminance is corrected is sent to the decoding portion 18 and decoded by the same so that the storage data stored inside is extracted (Step S18). The storage data is sent to the delivering portion 19 and delivered to an external device.

The fixed form image to be read by the fixed form image reading apparatus A is a fixed form image recorded in a tiny region, and it is a hologram though it is not a limitation. As a recording medium of the hologram, there is an optical recording medium such as an optical memory or an optical disc.

Figure 10:
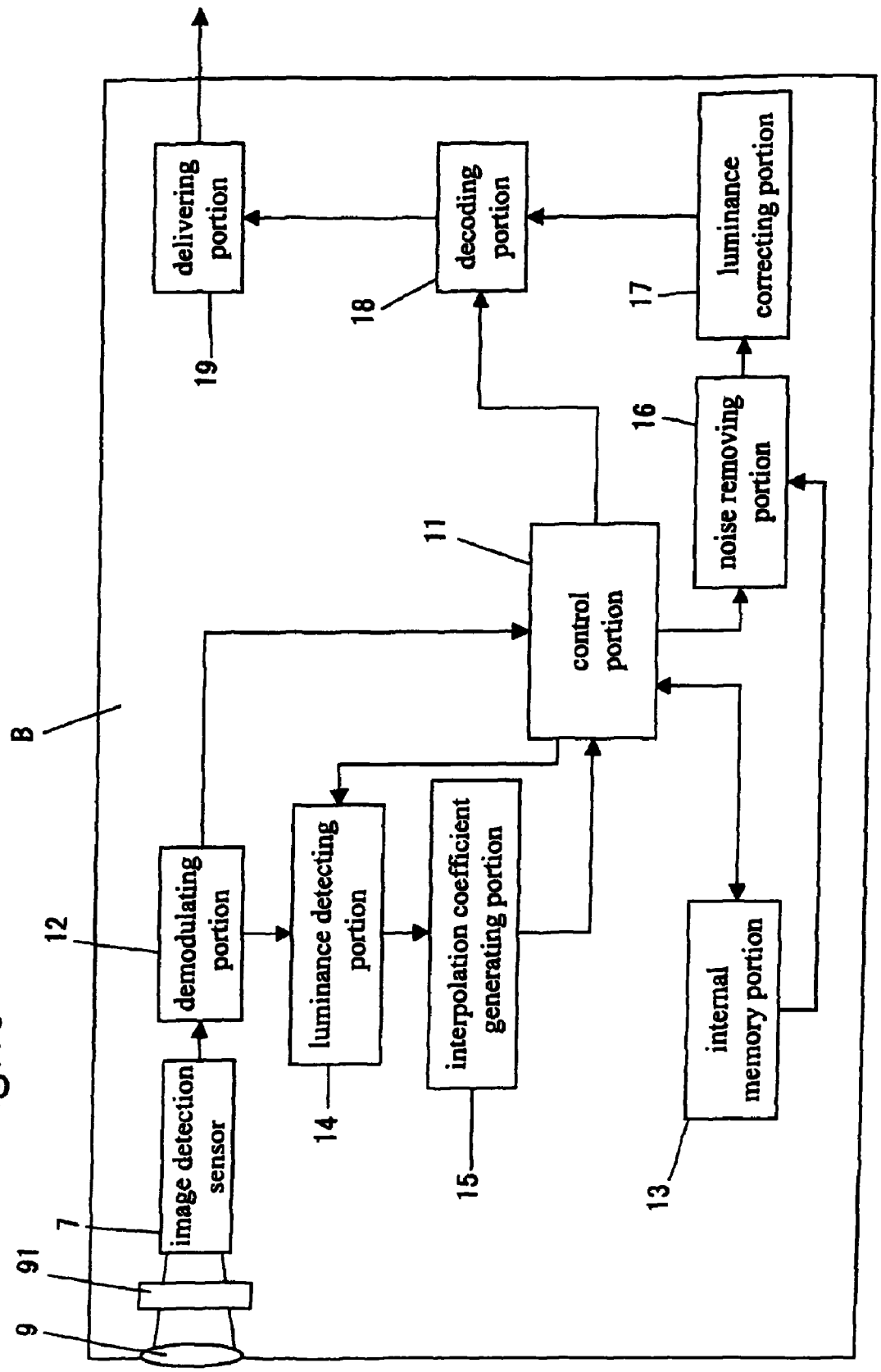
FIG. 10 is a block diagram showing a structure of another example of the fixed form image reading apparatus according to the present invention.

FIG. 10 is a block diagram showing a structure of another example of a fixed form image reading apparatus according to the present invention. A fixed form image reading apparatus B is equipped with an image detection sensor 7, an imaging lens 9 and a shutter 91. Other portions have the same structure as the fixed form image reading apparatus A, and substantially the same portion is denoted by the same reference numeral. The fixed form image 8 is reflecting external light. The light from the fixed form image 8 passes through the imaging lens 9 and is received by the image detection sensor 7. After that, image data stored in the fixed form image 8 is extracted from the electric signal delivered from the image detection sensor 7, and the method for extracting the data is the same as described above with reference to the flowchart shown in FIG. 5.

The fixed form image to be read by the fixed form image reading apparatus B is a fixed form image that can be viewed by human eye. It can be a two-dimensional code though it is not a limitation. As a recording medium of the two-dimensional code, there is a printed medium such as a paper sheet or a resin sheet.

In this way, luminance of the image data of the fixed form image is corrected so that an undesired component mixed like gradation can be removed effectively, and data stored in the fixed form image can be read correctly. Thus, ratio of errors caused by low quality of the recording medium or distortion due to the optical system of the fixed form image reading apparatus can be reduced.

Although the embodiments of the present invention are described above, the present invention is not limited to the embodiments described above, which can be modified variously within the scope of the present invention without deviating from the spirit of the same. It is possible to incorporate a plurality of features described in the individual embodiments.

What is claimed is:

1. A fixed form image reading apparatus that has an imaging portion for taking an image of a fixed form image formed in accordance with a predetermined rule and for delivering image data, so that data stored in the fixed form image is extracted from the image data, characterized in that the fixed form image reading apparatus includes:

a luminance detecting portion that calculates a sum of respective values of luminance within a plurality of predetermined areas in the image data to detect the sum as reference luminance data;

an interpolation coefficient generating portion that generates an interpolation coefficient for performing interpolation by using the reference luminance data so that a luminance distribution between the areas is approximated and that the approximated luminance distribution is smooth; and a luminance correcting portion that corrects a luminance distribution of the entire image data based on the interpolation coefficient.

2. The fixed form image reading apparatus according to claim 1, characterized by the luminance detecting portion calculates, as reference luminance data, a sum of respective values of luminance within position detection marks formed to have higher luminance than other part.

3. The fixed form image reading apparatus according to claim 1, characterized by the fixed form image that is a two-dimensional code.

4. The fixed form image reading apparatus according to claim 2, characterized by the fixed form image that is a two-dimensional code.

5. The fixed form image reading apparatus according to claim 1, characterized by a laser light source for emitting a laser beam and an objective lens for condensing the laser beam to be projected onto the fixed form image, which are further equipped.

6. The fixed form image reading apparatus according to claim 2, characterized by a laser light source for emitting a laser beam and an objective lens for condensing the laser beam to be projected onto the fixed form image, which are further equipped.

7. The fixed form image reading apparatus according to claim 5, characterized by a space modulator for performing space modulation of the laser beam, which is further equipped.

8. The fixed form image reading apparatus according to claim 6, characterized by a space modulator for performing space modulation of the laser beam, which is further equipped.

9. The fixed form image reading apparatus according to claim 7, characterized by the fixed form image that is a hologram.

10. The fixed form image reading apparatus according to claim 8, characterized by the fixed form image that is a hologram.

11. A fixed form image reading apparatus that has an imaging portion for taking an image of a fixed form image formed in accordance with a predetermined rule and for delivering image data, so that data stored in the fixed form image is extracted from the image data, comprising:

a laser light source that emits a laser beam;

a space modulator that performs space modulation of the laser beam;

an objective lens that condenses the laser beam to be projected onto a fixed form image formed in accordance with a predetermined rule;

an image sensor that detects the laser beam reflected by a recording medium and converts it into an electric signal;

a demodulating portion that demodulates an electric signal delivered from the image sensor and delivers image data;

a storing portion that stores first image data obtained by exposing the image sensor in the state where incident light of the image sensor is shut out; and a noise removing portion that removes noises unique to the image sensor by subtracting the first image data from the image data of the fixed form image;

characterized in that the fixed form image includes a plurality of position detection marks formed at predetermined positions to have higher luminance than other part, and a luminance detecting portion is provided for calculating a sum of respective values of luminance corresponding to each of the areas of position detection marks from luminance distribution of the position detection mark of the image data of the fixed form image as reference luminance data, an interpolation coefficient generating portion is provided for generating an interpolation coefficient for performing interpolation by using the reference luminance data so that a luminance distribution between the areas is approximated and that the approximated luminance distribution is smooth, and a luminance correcting portion is provided for correcting a luminance distribution of the entire image data based on the interpolation coefficient.

12. A fixed form image reading method for taking an image of a fixed form image formed on a recording medium in accordance with a predetermined rule, so as to extract data stored in the fixed form image from the image data, characterized in that the method includes:

an imaging step for taking an image of the fixed form image formed on the recording medium so as to obtain image data;

a luminance detecting step for calculating a sum of respective values of luminance within a plurality of predetermined area in the fixed form image as reference luminance data;

an interpolation coefficient generating step for generating an interpolation coefficient for performing interpolation using the reference luminance data so that a luminance distribution between the areas is approximated and that the approximated luminance distribution is smooth; and a luminance correcting step for correcting a luminance distribution of the entire image data based on the interpolation coefficient.

13. A fixed form image reading method for taking an image of a fixed form image formed in accordance with a predetermined rule, so as to extract data stored in the fixed form image from the image data, characterized in that the method includes;

a storing step for storing first image data obtained by exposing the imaging portion in the state where incident light of the imaging portion is shut out;

a laser beam emitting step for emitting a laser beam; an imaging step for detecting the laser beam reflected by a recording medium so as to obtain image data;

a noise removing step for removing noises unique to the imaging portion by subtracting the first image data from the image data of the fixed form image obtained in the imaging step;

a luminance detecting step for calculating a sum of respective values of luminance corresponding to each of areas of position detection marks, which are included in the fixed form image formed at predetermined positions to have higher luminance than other part, from luminance distribution of the position detection mark of the image data of the fixed form image as reference luminance data;

an interpolation coefficient generating step for generating an interpolation coefficient for performing interpolation using the reference luminance data so that a luminance distribution between the areas is approximated and that the approximated luminance distribution is smooth; and a luminance correcting step for correcting a luminance distribution of the entire image data based on the interpolation coefficient.

* * * * *